United States Patent [19]

Sekiya et al.

[11] Patent Number: 5,001,198

[45] Date of Patent: Mar. 19, 1991

[54] FLUORINE-CONTAINING POLYMERIC COMPOUND AND A METHOD FOR THE PREPARATION THEREOF

[75] Inventors: Akira Sekiya; Masanori Tamura; Hiroyasu Ishida, all of Tsukuba, Japan

[73] Assignee: Director General of Agency of Industrial Science & Technology, Tokyo, Japan

[21] Appl. No.: 306,987

[22] Filed: Feb. 6, 1989

[30] Foreign Application Priority Data

Feb. 15, 1988 [JP] Japan ................................. 63-32188
Feb. 15, 1988 [JP] Japan ................................. 63-32189

[51] Int. Cl.$^5$ ................................. C08F 8/20
[52] U.S. Cl. ........................ 525/328.2; 525/359.4; 526/248
[58] Field of Search ................. 525/328.2; 526/248

[56] References Cited

U.S. PATENT DOCUMENTS 2,839,516 6/1958 Weisgerber ....................... 525/326.8
4,604,451 8/1986 Harada et al. ..................... 525/328.2
4,606,973 8/1986 Schimdt et al. .................... 525/382.2

*Primary Examiner*—Bernard Lipman

*Attorney, Agent, or Firm*—Wyatt, Gerber, Burke and Badie

[57] ABSTRACT

A novel fluorine-containing polymeric compound represented by the general formula

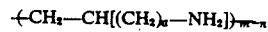

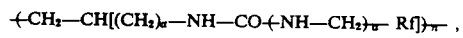

in which Rf is a perfluoroalkyl group having 6 to 15 carbon atoms, m is a positive integer in the range from 10 to 1500, n is a positive integer smaller than 0.7m and a is 0 or 1, is prepared by the reaction of, when a is 0, a polyvinylamine of the formula $+CH_2-CHNH_2)_{m}$, with an alkyl perfluoroalkanoate of the formula Rf—CO—OR, in which R is 1, a polyallylamine of the formula $+CH_2-CH(CH_2-NH_2)_{m}$, with a perfluoroalkylmethyl isocyanate of the formula RfCH$_2$—NCO. Despite the high fluorine content, the polymer is soluble in at least one kind of organic solvents so that Langmuir-Blodgett's films can be prepared from a solution of the polymer. The LB films have an extremely low surface energy and useful as a material for protection and modification of various surfaces.

3 Claims, 2 Drawing Sheets

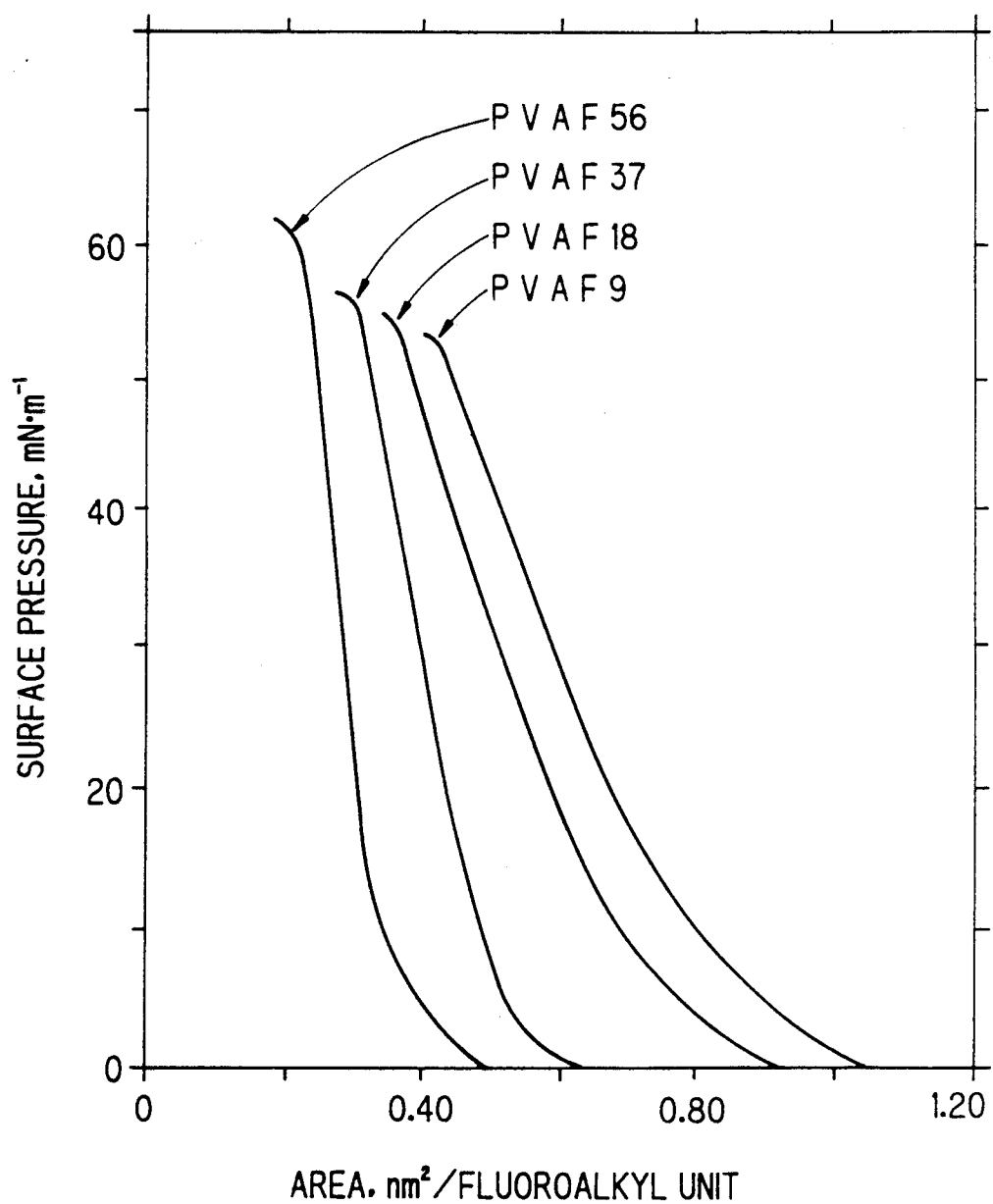

FLUORINE-CONTAINING POLYMERIC COMPOUND AND A METHOD FOR THE PREPARATION THEREOF

BACKGROUND OF THE INVENTION

The present invention relates to a novel fluorine-containing polymeric compound which is useful as a material of Langmuir-Blodgett's films as well as to a method for the preparation of such a fluorine-containing polymeric compound.

It is known that polymeric compounds modified with long-chain perfluoroalkyl groups have excellent properties such as water- and oil-repellency, insusceptibility to dust deposition, corrosion resistance and the like so that they are used, for example, for protection and surface modification of electronic circuit boards. Further, they are promising as a material of oxylene permeable membranes having improved selectivity for the permeation of oxygen relative to other gases by virtue of the high affinity of the perfluoroalkyl groups to oxygen.

A problem in the use of such a polymeric compound having perfluoroalkyl groups introduced into the molecular structure is that the polymer is hardly soluble in solvents due to the water- and oil-repellency inherent in the perfluoroalkyl groups so that fluorine-containing polymers are generally not handleable as a material of thin films. In other words, fluorine containing polymeric compounds can be shaped only with great difficulties into an extremely thin film as an essential element when the polymer is used as a material for surface modification or protection of boards While it is important that the perfluoroalkyl groups as the functional groups for the oil and water-repellency and other useful surface properties are oriented toward the surface of the polymeric material in order that the desired performance of surface modification and oxygen permeation can be fully exhibited, a general understanding is that control of such an orientation of polymeric molecules is far from possibility.

Preparation of a thin film or so called Langmuir-Blodgett's film referred to as an LB film hereinafter, of a fluorine-containing polymeric material is reported, for example, by R. Elbert, et al. in Journal of the American Chemical Society, volume 106, page 7678 (1984), according to which a fluorine containing ethylenically unsaturated monomeric compound is spread on the surface of water to form a monolayer film followed by the photopolymerization of the monomer by the irradiation with ultraviolet light. This method is, however, defective in respect of the uncontrollability of the density of the fluorine-containing molecular chain in the monomolecular film and indefiniteness of the degree of polymerization after the photopolymerization.

One of the inventors has been successful in preparing an LB film of a controlled molecular orientation from a polyallylamine modified with perfluoroalkyl groups. These perfluoroalkyl-modified polyallylamines, however, are still not quite satisfactory because the polymer cannot be shaped into a thin film when the content of the perfluoroalkyl groups introduced into the polymeric structure is high.

SUMMARY OF THE INVENTION

The inventors accordingly have continued extensive investigations to develop a method for the preparation of an extremely thin film of a fluorine-containing polymeric compound by utilizing the water-repellency or hydrophobicity of the perfluoroalkyl groups and, as a result, arrived at a discovery that a fluorine containing polymeric compound quite satisfactory as a material of extremely thin films in respect of the intramolecular and intermolecular orientation can be obtained when perfluoroalkyl groups are bonded to a part of the amino groups in a polyvinylamine or polyallylamine through an amide linkage or through a urea linkage to provide perfluoroalkyl-containing pendant groups.

Thus, the present invention completed on the base of the above mentioned discovery provides a fluorine-containing polymeric compound which is a novel compound having a structure represented by the general formula

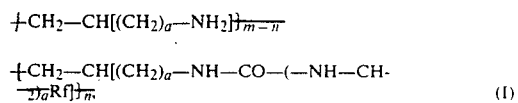

(I)

in which Rf is a perfluoroalkyl group having 6 to 15 carbon atoms, m is a positive integer in the range from 10 to 1500, n is a positive integer smaller than 0.7 m and a is 0 or 1.

According to the invention, the above defined fluorine containing polymeric compound having the subscript a equal to 0 can be prepared by the amidation reaction of a polyvinylamine expressed by the formula

 (II)

in which m has the same meaning as defined above, with an alkyl perfluoroalkanoate of the general formula Rf—CO—OR, (III)

in which Rf has the same meaning as defined above and R is an alkyl group having 1 to 5 carbon atoms.

The fluorine-containing polymeric compound of the general formula (I) having the subscript a equal to 1 can be prepared by the reaction of a polyallylamine expressed by the formula

 (IV)

in which m has the same meaning as defined above, with a perfluoroalkylmethyl isocyanate represented by the general formula RfCH₂—NCO, (V)

in which Rf has the same meaning as defined above.

According to the invention, the above defined fluorine-containing polymeric compound has good solubility in organic solvents to give a solution, from which an LB film can be readily prepared.

BRIEF DESCRIPTION OF THE DRAWING

FIGS. 1 and 2 each illustrate the F-A isotherms of the LB films prepared from the inventive fluorine-containing polymeric compounds of the general formula (I) in which the subscript a is 0 and 1, respectively.

DETAILED DESCRIPTION OF THE PREFERRED EMBODIMENTS

Figure 2:
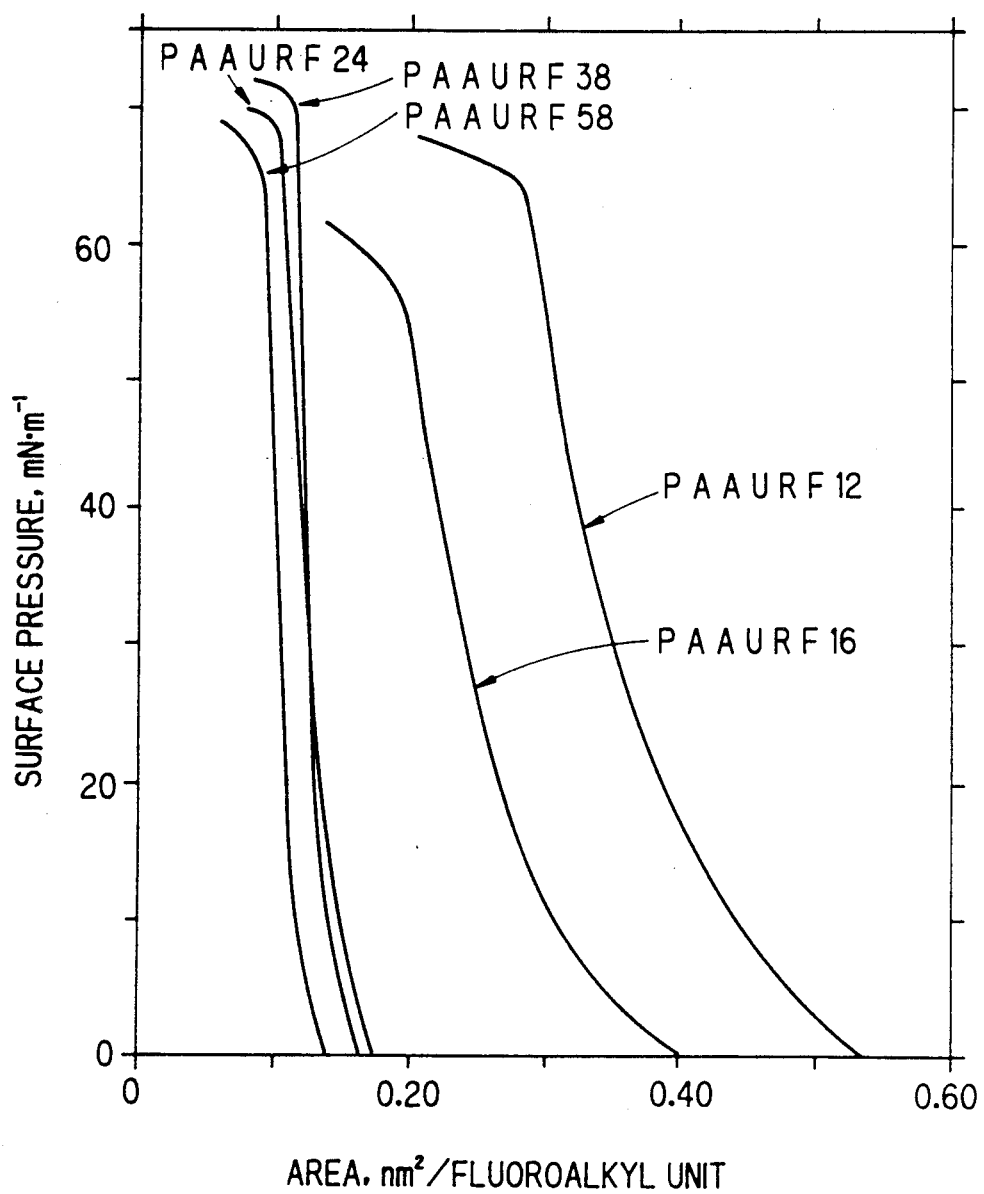

As is described above, the fluorine containing polymeric compound of the invention represented by the general formula (I) having the subscript a equal to 0 can be obtained by the amidation reaction between a polyvinylamine of the general formula (II) and an alkyl perfluoroalkanoate of the general formula (III) according to the reaction equation

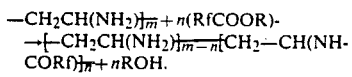

The polyvinylamine as the starting material of this amidation reaction can be prepared from a polyacrylamide having an average molecular weight of, for example, about 7000 which is subjected to the reaction of so-called Hoffmann degradation to give a polyvinylamine hydrochloride followed by neutralization thereof with a base.

The amidation reaction of this equation is performed usually in an alcohol such as methyl alcohol as the solvent by keeping the reaction mixture at a temperature in the range from $-10°$ C. to $+50°$ C. or, preferably from $+15°$ C. to $30°$ C. Suitable alcohols as the solvent for the reaction include methyl, ethyl, n-propyl, isopropyl, n-butyl, sec-butyl, isobutyl, tert-butyl and n-amyl alcohols, of which methyl alcohol is preferred. The reaction is performed preferably by adding an alkyl perfluoroalkanoate of the general formula (III) into a solution of a polyvinylamine prepared by dissolving a polyvinylamine in a solvent or by neutralizing a solution of a polyvinylamine hydrochloride in a solvent. The ratio of the subscripts n to m or the degree of amidation, referred to as the degree of modification hereinafter, can be freely controlled by adequately selecting the amount of the alkyl perfluoroalkanoate relative to the polyvinylamine. The amidation reaction proceeds in a homogeneous phase without precipitates formed in the reaction mixture unless the degree of modification exceeds about 70%. The reaction is usually complete within several minutes to several hours under agitation of the reaction mixture. The reaction mixture after completion of the reaction is subJected to evaporation of the solvent and washing with water and the thus obtained polymeric product is dried. The product can be identified to be the desired amidated polyvinylamine from the results of the chemical analysis for the content of fluorine and the infrared absorption spectroscopic analysis.

The amidated polyvinylamine containinq the perfluoro alkyl groups is soluble in organic solvents when the degree of modification does not exceed about 70% and the solution can be easily spread on water surface to form a monolayer film from which an LB film can be prepared. It has been found from the measurement of the surface pressure vs. area isotherm, referred to as the F-A isotherm hereinafter, for the monolayer film spread on water surface that decrease in the degree of modification facilitates preparation of an ultra thin film in which an increased area is occupied by one perfluoroalkyl group.

An LB film was prepared by depositing a single layer or a plural number of the layers spread on water surface on to a glass plate and the film thickness and the critical surface tension $\gamma_c$ of the film in dyn/cm relative to n-alkanes were determined to give a result that the $\gamma_c$ for a single layer of the LB film was about 16 when the degree of modification was 37%, 18% or 9% while the value of $\gamma_c$ for a three fold layer was about 14. The value of $\gamma_c$ for an LB film having a degree of modification of 56% was about 13. These results indicate that the perfluoroalkyl-containing amidated polyvinylamine has a surface in a condition of a very low surface energy to exhibit high water- and oil-repellency as well as excellent insusceptibility to dust deposition. The above mentioned values of $\gamma_c$ are consider ably smaller than the value 18.5 of a polytetrafluoroethylele resin. The value of the $\gamma_c$ of the LB film prepared according to the invention is stable against a heat treatment at 90 ° C. for 2 hours when the degree of modification is high although the value of $\gamma_c$ is increased by an increment of about 2 when the degree of modification is low by the same heat treatment.

The thickness of the LB films per single layer can be determined in two ways to give somewhat different values of 0.4 to 0.6 nm by the method using a Talystep and 0.6 to 0.9 nm by the X-ray diffractometry. These results indicated that the thickness of the LB films of the perfluoroalkyl-containing amidated polyvinylamine is extremely small.

When the subscript a in the formula (I) is 1, the inventive polymer can be prepared by the reaction of a polyallylamine of the general formula (IV) with a perfluoroalkylmethyl isocyanate of the general formula (V). The polyallylamine as the starting material of the reaction can be obtained by neutralizing a polyallylamine hydrochloride with a basic compound. The reaction of the polyallylamine with the perfluoroalkylmethyl isocyanate of the general formula (V) can be expressed by the following reaction equation:

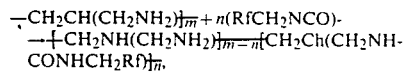

in which each symbol has the same meaning as defined before.

The above mentioned reaction is performed preferably by adding the perfluoroalkylmethyl isocyanate into a solution of the polyallylamine in a reaction medium, which is preferably a mixture of dimethyl sulfoxide and benzene, at a temperature in the range from 10° to 50° C. or, preferably, from 15° to 30° C. The degree of modification of the polyallylamine with the perfluoroalkyl groups bonded through urea bonds can be controlled by suitably selecting the amount of the perfluoroalkylmethyl isocyanate relative to the polyallylamine. The reaction is complete usually within several minutes to several hours under agitation of the reaction mixture. After completion of the reaction, the reaction mixture is freed from the solvent by evaporation and the residue is washed with water and dried to give a fluorine-containing polymeric product which can be identified by the chemical analysis for the fluorine content and infrared absorption spectroscopy to be the polymer expressed by the general formula (I) in which the subscript a has a value of 1. It is noted that the urea bond in the inventive polymer is more stable against hydrolysis than the amide bond.

When the degree of modification with the perfluoroalkyl groups bonded through the urea bond does not exceed 60%, the polymer is soluble in several organic solvents including a mixture of 2,2,2-trifluoroethyl alcohol and benzene and the solution can be spread on water surface to form a monolayer from which an LB film can be easily prepared. Measurements of the F-A Isotherms give a conclusion that a decrease in the degree of modification facilitates preparation of an ultra thin film in which a single perfluoro alkylmethyl group occupies an increased area. Further, the area occupied by a single perfluoroalkylmethyl group is decreased to about a half of the value of 0.28 nm², which is the cross sectional area of the perfluoroalkylmethyl group, or smaller. This fact indicates that the perfluoroalkylmethyl groups are folded in multifold overlapping in the thin film.

An LB film was prepared by depositing a single layer or a plural number of the layers spread on water surface on a glass plate and the film thickness and the critical surface tension $\gamma_c$ of the film in dyn/cm relative to n-alkanes were determined to give a result that the value of $\gamma_c$ for a single layer of the LB film was about 16 when the degree of modification was 12%, 16%, 24% or 38% while the value for a three-fold layer was about 15. The value of $\gamma_c$ for an LB film having a degree of modification of 58% was smaller by about 1 than each of the above mentioned values for both of a single and a three-fold layers. The above mentioned values of $\gamma_c$ in dyn/cm are considerably smaller than the value 18.5 of a poly(tetrafluoroethylene) resin. The value of $\gamma_c$ of the LB film prepared according to the invention is stable against a heat treatment at 80° C. for 2 hours. When an LB film of a three fold layer of a 58%-modified polymer is dipped in 2,2,2-trifluoroethyl alcohol, the value of $\gamma_c$ decreases to 9.7 indicating that rearrangement of the perfluoroalkylmethyl groups takes place in the presence of the fluorine-containing solvent so as to be aligned in upright dispositions of the groups on the film surface.

The thickness of the LB films per single layer can be determined in two ways by using a Talystep or by the X-ray diffractometry to give a value of about 3 nm for a polymer having a degree of modification of 12% while the value increases to 4 to 10 nm by increasing the degree of modification above 24% indicating that the multifold overlapping of the perfluoroalkylmethyl groups has an effect of increasing the film thickness.

As is described above, the degree of modification of the polyvinylamine or polyallylamine with the perfluoro alkyl-containing pendant groups can be freely controlled by adjusting the amount of the perfluoroalkyl containing reactant relative to the base polymer. When the degree of modification does not exceed a certain limit, the perfluoroalkyl-containing polymer is soluble in at least one organic solvent so that an LB film of an extremely small film thickness can be prepared from the solution. The area occupied by a single perfluoroalkyl group in the thus prepared thin film can be controlled by changing the degree of modification. The thus prepared LB films of the inventive polymer have an extremely low surface energy as compared even with a polytetrafluoroethylene resin by virtue of the perfluoro alkyl groups on the surface.

EXAMPLE 1

A polyacrylamide was prepared according to a known method described in "Experimental Method for Synthesis of Polymers", published by Tokyo Kagaku Dojin, 1962, at page 157 excepting the use of 30 times excess amount of the solvent and 10 times excess amount of ammonium persulfate $(NH_4)_2S_2O_8$ as a polymerization initiator. The thus obtained polyacrylamide had a relatively small weight-average molecular weight of 7100 calculated from the intrinsic viscosity using the equation of $[\eta] = 6.8 \times 10^{-4} M^{0.66}$.

The polyacrylamide was then subjected to the reaction of Hoffmann degradation according to a known method described in "Kobunshi Ronbunshu", 33, 309 (1976) to give a polyvinylamine hydrochloride.

A methyl alcohol solution of sodium methylate was prepared by adding 0.06 g of metallic sodium to 7.5 ml of methyl alcohol and, when evolution of hydrogen gas from the solution had ceased, 0.11 g of the polyvinylamine hydrochloride obtained above was added to the solution and stirred in a covered reaction vessel. The precipitates of sodium chloride were removed from the reaction mixture by filtration. Thereafter, the thus obtained filtrate was admixed with ethyl perfluorooctanoate in an amount to give 9%, 18%, 37%, 56% or 65% by moles of the perfluoroalkyl groups relative to the amino groups in the polyvinylamine and the mixture was stirred for 4 hours at room temperature. The reaction mixture after completion of the reaction was a clear solution and could be used as such in the preparation of LB films.

The polymer solution prepared in the above described manner was then freed from the solvent to dryness by evaporation under reduced pressure and the solid residue was washed with water and dried to give a polymeric compound of which the degree of modification was 9%, 18%, 37%, 56% or 65% each with a possible error of ±1% as determined by the quantitative analysis for the content of fluorine When the amount of the ethyl perfluorooctanoate as the reactant was increased to correspond to a degree of modification of 74%, precipitates were formed in the reaction mixture. The infrared absorption spectra of these polymer products indicated strong absorption bands at a wave number of 1700 cm$^{-1}$ assignable to amide bonds and in a wave number region of 1100 to 1300 cm$^{-1}$ assignable to C—F bonds.

EXAMPLE 2

A methyl alcohol solution of sodium methylate was prepared by adding 1.14 g of metallic sodium to 30 ml of methyl alcohol and, when evolution of hydrogen gas from the solution had ceased, 4.94 g of a polyallylamine hydrochloride having an average molecular weight of about 9000 were added to the solution and stirred in a covered reaction vessel. The precipitates of sodium chloride separated from the reaction mixture by filtration were washed with 16 ml of methyl alcohol and the washing was combined with the filtrate as a solution of the polyallylamine. Thereafter, methyl alcohol was added to make up the volume of the solution to 50 ml. A 5.0 ml portion of this solution was taken and freed from the solvent by evaporation under reduced pressure and the residue was dissolved by adding 20 ml of dried dimethyl sulfoxide and 12 ml of dried benzene to form a clear solution. This solution under vigorous stirring was admixed at one time with a solution of 0.125 g of perfluorooctylmethyl isocyanate in a mixture of 50 ml of dried dimethyl sulfoxide and 30 ml of dried benzene, precipitation of a small amount of the fluorinated polymer was noted in the reaction mixture. The reaction mixture was then freed from the solvents by evaporation under reduced pressure and the residue was washed successively with ether and water followed by drying to give a polymeric product which was a polyallylamine having pendant groups of perfluorooctylmethyl groups bonded to the polymeric chain through urea bonds with a degree of modification of 16%. The infrared absorption spectrum of this polymeric product indicated strong absorption bands assignable to the urea bonds at wave numbers of 1660 and 1585 cm$^{-1}$ and assignable to the C-F bonds in a wave number region of 1300 to 1100 cm$^{-1}$. The degree of modification of this polymeric product of 16% was obtained by calculating from the content of fluorine 38.7% determined by the chemical analysis.

Similarly, another perfluoroalkyl-modified polyallylamine having a content of fluorine of 45.1% corresponding to a degree of modification of 24% was prepared from 3.0 ml of the polyallylamine solution in methyl alcohol prepared above and 0.298 g of perfluorooctylmethyl isocyanate.

EXAMPLE 3

A perfluoroalkyl-modified polyallylamine was prepared from a 5.0 ml portion of the polyallylamine solution in methyl alcohol prepared in Example 2 and 0.057 g of perfluorooctylmethyl isocyanate in a similar manner to Example 2. A 52.5 mg portion of the thus obtained polymeric product was dissolved in 100 ml of 2,2,2-trifluoroethyl alcohol to give a solution from which insoluble matter was removed by filtration. Evaporation of the solvent from the filtrate under reduced pressure gave a perfluoroalkyl-modified polyallylamine which contained 34.6% of fluorine corresponding to a degree of modification of 12%.

A 54.1 mg portion of the 24%-modified polymer obtained in Example 2 was washed with 10 ml of 2,2,2-trifluorethyl alcohol to extract out the polymer fraction of relatively low degrees of modification followed by a second extraction in a similar manner to above using 75 ml of 2,2,2-trifluoroethyl alcohol to leave a fraction of the polymers of higher degrees of modification. The thus obtained polymer contained 51.5% of fluorine corresponding to a degree of modification of 38%.

EXAMPLE 4

A perfluoroalkyl modified polyallylamine was prepared from a 2.0 ml portion of the polyallylamine solution in methyl alcohol prepared in Example 2 and 0.296 g of perfluorooctylmethyl isocyanate in a similar manner to Example 2. A 150 mg portion of the thus obtained polymeric product was washed with a mixture of 10 ml of 2,2,2-trifluoroethyl alcohol and 50 ml of benzene to remove the fraction of relatively low degrees of modification. The thus obtained perfluoroalkyl-modified polyallylamine contained 56.3% of fluorine corresponding to a degree of modification of 58%.

EXAMPLE 5

Each of the perfluoroalkyl-modified polyvinylamines prepared in Example 1 was dissolved in a low concentration in a mixture of methyl alcohol and benzene and the solution was spread on water surface at 17° C. to determine the relationship between the surface pressure and the area occupied by a single molecule or to obtain a so-called F-A isotherm shown in FIG. 1 of the accompanying drawing which includes the curves of PVAF 9, PVAF 18, PVAF 37 and PVAF 56, which refer to the polymers having degrees of modification of 9%, 18%, 37% and 56%, respectively. These results indicate that the limiting areas or the areas occupied by a single perfluoroacyl group of the polymer in a monolayer are 0.78, 0.64, 0.49 and 0.30 nm in the polymers PVAF 9, PVAF 18, PVAF 37 and PVAF 56, respectively.

The ultra thin film spread on the water surface could be deposited on a glass plate at a surface pressure of 20 mN·m$^{-1}$ as a film of a single monolayer or a film of a multi-fold accumulated layers. The films each had an appearance of complete transparency.

EXAMPLE 6

The LB films prepared in the preceding example from the polymers PVAF 9, PVAF 18, PVAF 37 and PVAF 56 were subjected to the measurement of the contact angle against n-alkanes including the films of a single monolayer and films of three-fold accumulated layers as prepared, after a heat treatment at 90° C. for 2 hours and after a treatment by dipping in methyl alcohol at 20° C. for 24 hours followed by drying. The values of critical surface tension $\gamma_c$ in dyn/cm were calculated from a Zisman plot of the thus determined contact angles by utilizing the least square method to give the results shown in Table 1.

TABLE 1

| | Critical surface tension $\gamma_c$, dyn/cm | | | | |
|---|---|---|---|---|---|
| | As prepared | | After heat treatment (see text) | After treatment with methyl alcohol (see text) | |
| Layer | Single | Three-fold | Single | Single | Three-fold |
| PVAF56 | 13.9 | 13.1 | 13.7 | 20.8 | 17.2 |
| PVAF37 | 16.4 | 14.8 | 16.5 | 24.2 | 19.6 |
| PVAF18 | 16.9 | 14.9 | 18.0 | 26.8 | 21.6 |
| PVAF9 | 16.2 | 14.0 | 18.3 | —(1) | 22.3 |
| PAAURF12 | 16.6 | 15.5 | 15.7(3) | 16.8 | —(2) |
| PAAURF16 | 16.3 | 15.1(4) | 15.2(4) | 16.4 | 16.7(4) |
| PAAURF24 | 16.1 | 15.3 | 15.6(3) | 16.3 | 17.4 |
| PAAURF38 | 15.9 | 14.8 | 15.3(3) | 15.7 | 16.8 |
| PAAURF58 | 15.5 | 14.5 | 14.2(3) | 15.9 | 9.7 |

(1) No drops of n-alkanes were formed.
(2) $\gamma_c$ could not be determined due to disorder in the condition of film surface resulting in poor reproducibility of the value.
(3) Film of 3-fold accumulated layers
(4) Film of 5-fold accumulated layers

EXAMPLE 7

LB films of ten-fold accumulated layers were prepared from the polymers PVAF 9, PVAF 18, PVAF 37 and PVAF 56 in a manner similar to Example 5 and subjected to the measurement of the film thickness in the following two ways.

Thus, a part of the LB film was peeled off from the substrate surface and the level difference between the area with the LB film thereon and the bare substrate surface after exfoliation of the LB film was determined by using a Talystep to give a result that the thickness was 4 to 6 nm±2 nm in each of the LB films of PVAF 9, PVAF 18, PVAF 37 and PVAF 56. The thickness of a single monolayer would be one tenth of this value.

Separately, each of the LB films was subjected to the X-ray diffractometry by using the Cu K$_{\alpha 1}$ line of the wavelength of 0.154050 nm with an acceleration voltage of 40 kV and beam current of 30 mA to give a diffraction diagram from which the film thickness was calculated by utilizing the Bragg's equation to give a value of 5 to 8.5 nm in each of PVAF 9, PVAF 18, PVAF 37 and PVAF 56. The thickness of a single monolayer would be one tenth of this value.

EXAMPLE 8

Each of the perfluoroalkyl-modified polyallylamines prepared in Examples 2 to 4 was dissolved in a low concentration in a mixture of 2,2,2-trifluoroethyl alcohol and benzene and the solution was spread on water surface at 17° C. to determine the relationship between the surface pressure and the area occupied by a single molecule or to obtain a so-called F-A isotherm shown in FIG. 2 of the accompanying drawing which includes the curves of PAAURF 12, PAAURF 16, PAAURF 24, PAAURF 38 and PAAURF 58, which refer to the polymers having degrees of modification of 12%, 16%, 24%, 38% and 58%, respectively. These results indicate that the limiting areas or the areas occupied by a single perfluoroalkylmethyl group of the polymer in a monolayer are 0.40, 0.28, 0.14, 0.13 and 0.12 nm in the polymers PAAURF 12, PAAURF 16, PAAURF 24, PAAURF 38 and PAAURF 58, respectively.

The ultra thin film spread on the water surface could be deposited on a glass plate at a surface pressure of 20 mN·m$^{-1}$ as a film of a single monolayer or a film of a multi-fold accumulated layers. The films each had an appearance of complete transparency.

EXAMPLE 9

The LB films prepared in the preceding example from the polymers PAAURF 12, PAAURF 16, PAAURF 24, PAAURF 38 and PAAURF 58 were subjected to the measurement of the contact angle against n alkanes including the films of a single monolayer and films of three-fold (five fold for PAAURF 16) accumulated layers as prepared, after a heat treatment at 80° C. for 2 hours and after a treatment by dipping in methyl alcohol at 20° C. for 24 hours followed by drying. The values of critical surface tension $\gamma_c$ in dyn/cm were calculated from a Zisman plot of the thus determined contact angles by utilizing the least square method to give the results shown in Table 1.

EXAMPLE 10

LB films of ten-fold accumulated layers were prepared from the polymers PAAURF 12 PAAURF 16, PAAURF 24 PAAURF 38 and PAAURF 58 in a manner similar to Example 8 and subjected to the measurement of the film thickness in the following two ways.

Thus, a part of the LB film was peeled off from the substrate surface and the level difference between the area with the LB film thereon and the bare substrate surface after exfoliation of the LB film was determined by using a Talystep to give a result that the thickness was 25 nm±5 nm in the LB film of PAAURF 12 and 40 to 100 nm in the LB films of PAAURF 24, PAAURF 38 and PAAURF 58. The thickness of a single monolayer would be one tenth of this value.

Separately, each of the LB films was subjected to the X-ray diffractometry by using the Cu K$_{\alpha 1}$ line of the wave length of 0.154050 nm with an acceleration voltage of 40 kV and beam current of 30 mA to give a diffraction diagram from which the film thickness of the single layer was calculated by utilizing the Bragg's equation to give a value of about 2.8 nm, 3.5 nm, 5.5 to 9.0 nm and 5.5 to 9.0 nm for the polymers of PAAURF 12, 16, 24 and 58, respectively.

What is claimed is:

1. A fluorine-containing polymeric compound having a structure represented by the general formula

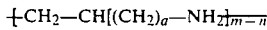

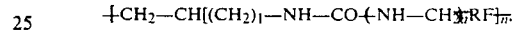

in which RF is a perfluoroalkyl group having 6 to 15 carbon atoms, m is a positive integer in the range from 10 to 1500, n is a positive integer smaller than 0.7 m and a is 0 or 1.

2. The fluorine-containing polymeric compound as claimed in claim 1 wherein the subscript a has a value of 0.

3. The fluorine-containing polymeric compound as claimed in claim 1 wherein the subscript a has a value of 1.

* * * * *

UNITED STATES PATENT AND TRADEMARK OFFICE
CERTIFICATE OF CORRECTION

PATENT NO. : 5,001,198
DATED : March 19, 1991
INVENTOR(S) : Akira Sekiya, et. al.

It is certified that error appears in the above-indentified patent and that said Letters Patent is hereby corrected as shown below:

Title page, item [57], Abstract, line 9, from the bottom of the Abstract, insert --an alkyl group having 1 to 5 carbon atoms, or when a is-- between "in which R is" and "1,".
Title page, item [57], Abstract, line 8 from the bottom of the Abstract, change the formula:

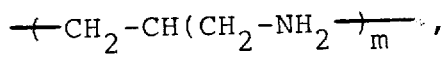

to read:

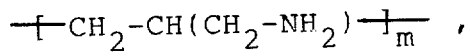

Column 1, line 18, change "oxylene" to read --oxygen--

UNITED STATES PATENT AND TRADEMARK OFFICE
CERTIFICATE OF CORRECTION

PATENT NO. : 5,001,198
DATED : March 19, 1991
INVENTOR(S) : Akira Sekiya, Masanori Tamura and Hiroyasu Ishida It is certified that error appears in the above-identified patent and that said Letters Patent is hereby corrected as shown below:

Column 2, lines 15-19, change the formula:

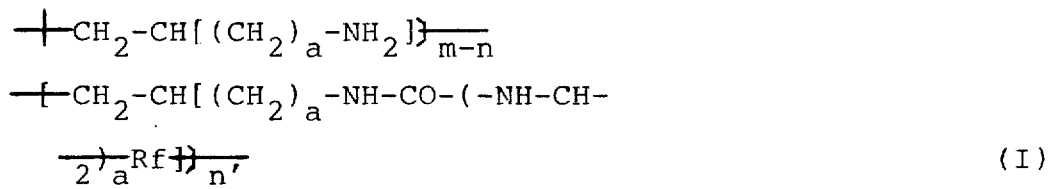

to read:

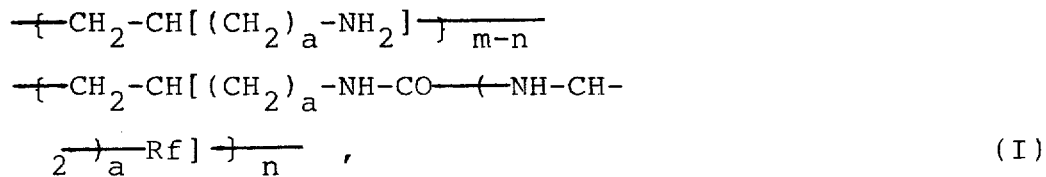

Column 2, line 23, change "0.7 m" to read --0.7m--

Column 2, line 30, change the formula:

to read:

$-\!\!\!+\!\!CH_2-CHNH_2\!\!\overline{\phantom{+}\!\!\!\!\!}_m$ ,     (II)

UNITED STATES PATENT AND TRADEMARK OFFICE
CERTIFICATE OF CORRECTION

PATENT NO. : 5,001,198
DATED : March 19, 1991
INVENTOR(S) : Akira Sekiya, Masanori Tamura and Hiroyasu Ishida It is certified that error appears in the above-identified patent and that said Letters Patent is hereby corrected as shown below:

Column 2, line 43, change the formula:

(IV)

to read:

  (IV)

Column 3, line 5, change the reaction equation:

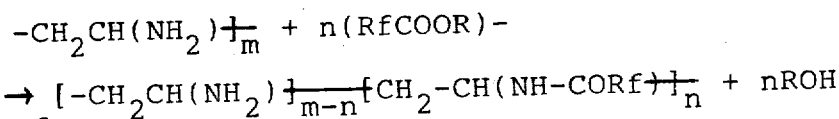

to read:

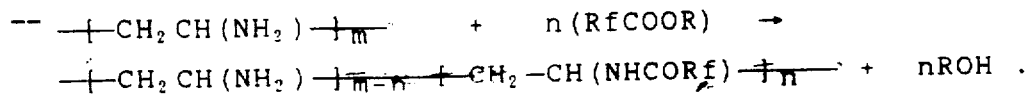

Column 3, line 38, change "subJected" to read --subjected--.

Column 4, line 3, change "consider ably" to read --considerably--.

UNITED STATES PATENT AND TRADEMARK OFFICE
CERTIFICATE OF CORRECTION

PATENT NO. : 5,001,198
DATED : March 19, 1991
INVENTOR(S) : Akira Sekiya, Masanori Tamura and Hiroyasu Ishida It is certified that error appears in the above-identified patent and that said Letters Patent is hereby corrected as shown below:

Column 4, line 28, change the reaction equation:

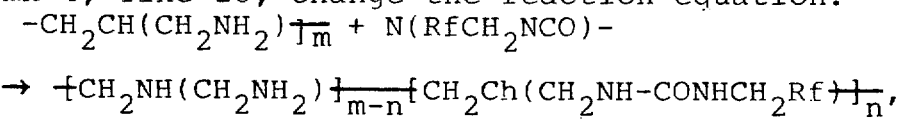

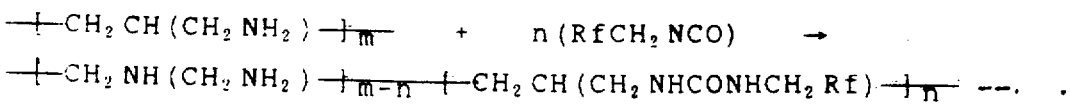

to read:

-$(CH_2CH(CH_2NH_2))_m$- + n($RfCH_2NCO$) →

-$(CH_2NH(CH_2NH_2))_{m-n}$-$(CH_2CH(CH_2NHCONHCH_2Rf))_n$- --.

Column 4, line 63, change "Isotherms" to read --isotherms--.

Column 5, line 65, change "33," to read ---$\underline{33}$---;

Column 6, line 22, after "fluorine" insert --.--

Column 7, line 62, change "nm" to read --nm$^2$--

Column 8, change in the first line of and footnote (2) to Table 1, " (Greek zeta)c" to read -- (Greek gamma)c--.

UNITED STATES PATENT AND TRADEMARK OFFICE
CERTIFICATE OF CORRECTION

PATENT NO. : 5,001,198
DATED : March 19, 1991
INVENTOR(S) : Akira Sekiya, Masanori Tamura and Hiroyasu Ishida It is certified that error appears in the above-identified patent and that said Letters Patent is hereby corrected as shown below:

Column 9, line 7, change "nm" to read --$nm^2$--,

Claim 1, lines 3-4, change the formula:

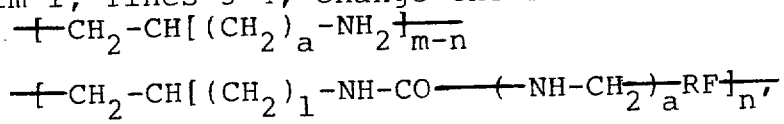

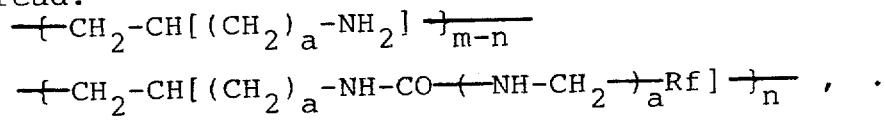

to read:

$$-[-CH_2-CH[(CH_2)_a-NH_2]-]_{m-n}$$

$$-[-CH_2-CH[(CH_2)_a-NH-CO-[-NH-CH_2-]_a-Rf]-]_n,$$

Claim 1, line 5, change "RF" to read --Rf--.

Claim 1, line 7, change "0.7 m" to read --0.7m--.

Signed and Sealed this

Third Day of June, 1997

Attest:

BRUCE LEHMAN

*Attesting Officer*      Commissioner of Patents and Trademarks